C. A. HUSSEY.
Car-Axle Box.

No. 159,824.  Patented Feb. 16, 1875.

WITNESSES:
Chas. Nidd.
Alex F. Roberts

INVENTOR:
C. A. Hussey
BY
ATTORNEYS.

THE GRAPHIC CO.PHOTO-LITH.39 & 41 PARK PLACE,N.Y.

UNITED STATES PATENT OFFICE.

CHARLES A. HUSSEY, OF NEW YORK, N. Y.

IMPROVEMENT IN CAR-AXLE BOXES.

Specification forming part of Letters Patent No. 159,824, dated February 16, 1875; application filed September 21, 1874.

*To all whom it may concern:*

Be it known that I, CHARLES ALBERT HUSSEY, of New York city, in the county and State of New York, have invented a new and useful Improvement in Journal-Bearings, of which the following is a specification:

The invention will first be fully described, and then pointed out in the claim.

Figure 1:
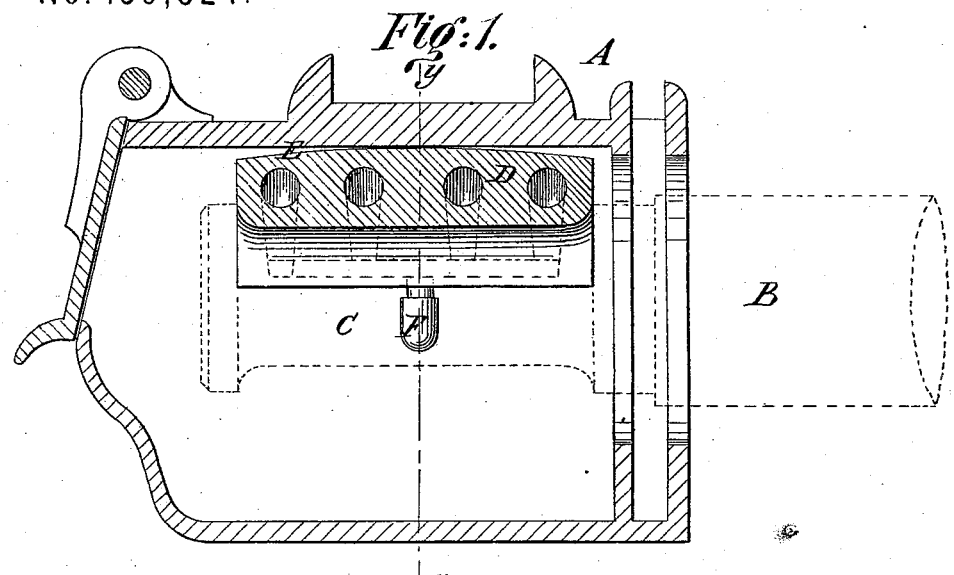
Figure 2:
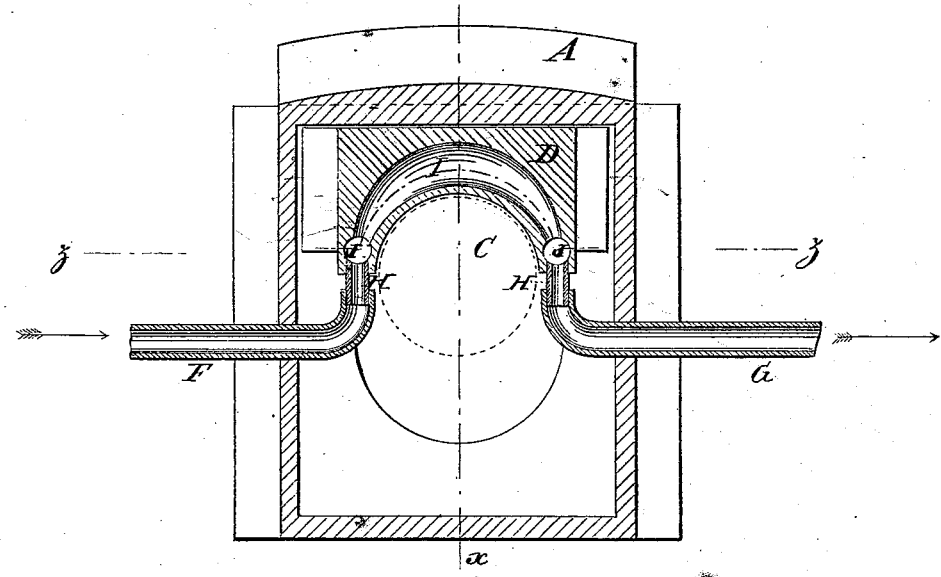
Figure 3:
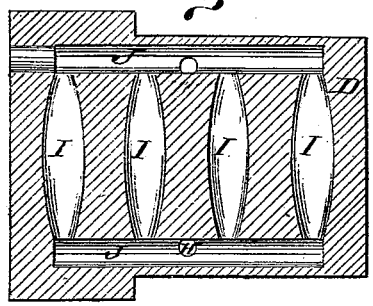

In the accompanying drawing, Figure 1 is a longitudinal section of a railroad axle-box, taken on the line *x x* of Fig. 2, showing the bearing. Fig. 2 is a cross-section of the same, taken on the line *y y* of Fig. 1, showing also a cross-section of the bearing. Fig. 3 is a section of the bearing, taken on the line *z z* of Fig. 2.

Similar letters of reference indicate corresponding parts.

A represents the axle-box of a car-truck, which does not differ in form, size, or construction from those used on ordinary railroads. B is the axle. C is the journal. D is the journal-bearing. This bearing occupies the same position on the axle and in the box that journal-bearings usually do; but its upper surface E is the arc of a circle longitudinally, so that it will more readily adjust itself to the journal.

The main feature of this invention is the provision made for keeping the bearing cool by means of a circulation of water or other liquid, or of air through the bearing in any direction.

In this example of my invention, the conducting-tubes F and G are attached by means of the short stationary tubes H H to the sides of the bearing, and the bearing is made with four transverse grooves, I, which connect with the two longitudinal grooves J, the short stationary tubes H being connected with the latter, as represented in Fig. 2. The transverse grooves I are made largest in the middle, as seen in Fig. 3, so as to have the largest amount of water or other fluid directly above or over the upper surface of the journal, where the friction is greatest.

The conducting-tubes are made of rubber or other flexible material, and pass through the sides of the box B A, as represented, the tube F being connected with an elevated reservoir of water or other liquid, and the tube G used to discharge the liquid after it has been passed through the bearing, or to conduct the liquid to the next bearing of the car.

Where atmospheric air is employed, the conducting-tubes may be short, or just protrude through the axle-box, and be connected with funnels to concentrate the air, when the motion of the car will force a current through the bearing.

Where a current of water is made to pass through the bearing, the journal cannot become heated to above the boiling-point, as the heat will be conducted off by the current, and in ordinary cases the journal will be kept cool or at a low temperature at all times.

By this improvement the bearings of car-axles may be made of metal as hard as the journal, if desired, and the heating caused by friction, and consequent decrease of power, damage, and delay, will be avoided.

I am aware that a journal-bearing has been provided with holes passing longitudinally therethrough, so that the air already in the axle-box may circulate therethrough; but as this air soon gets heated and loses its power of cooling the bearing, it has been found of comparatively little avail. I am also aware that a chamber in the bearing has been connected by diametrically-opposite holes with funnels on the outside of the axle-box, to produce a constant inlet and circulation of cold air; but the air-chamber is bottomless, in order to impinge the air directly upon the journal. The effect of this is to introduce a gradual supply of dust and fine grit, that defeats the very object in view, causing great friction between the journal and its bearing, great consequent wear, and the generation of an unusual amount of heat.

By connecting my bearing-chambers I, which do not open into the axle-box, with a superposed water-reservoir, I produce a practically constant circulation of cold liquid, that insures the bearing against any injurious accumulation of heat.

The construction of the air-chambers, tc which allusion is made, would preclude the use of a liquid cooling agent.

What I claim is—

The flexible pipes F F, to lead to a superposed reservoir, the bearing D having cavities I, not opening into the axle-box, but connected with said pipes by the tubes H, all combined as and for the purpose specified.

CHARLES ALBERT HUSSEY.

Witnesses:
T. B. MOSHER,
ALEX. F. ROBERTS.